: 3,428,637
PERINONE DYES
Xaver Pfister, Riehen, Basel-Stadt, and Karl Ulrich Steiner, Binningen, Basel-Land, Switzerland, assignors to Sandoz Ltd. (also known as Sandoz A.G.), Basel, Switzerland
No Drawing. Continuation-in-part of application Ser. No. 528,361, Feb. 18, 1966. This application Nov. 16, 1967, Ser. No. 683,470
Claims priority, application Switzerland, Feb. 25, 1965, 2,597/65; Aug. 5, 1965, 11,046/65
U.S. Cl. 260—251    5 Claims
Int. Cl. C07d *51/28, 27/30, 29/38*

ABSTRACT OF THE DISCLOSURE

Acylamino-substituted perinone pigment dyes eminently suitable for the coloration of synthetic materials, in particular synthetic polyamides, in the melt.

---

This application is a continuation-in-part of application Ser. No. 528,361, filed Feb. 18, 1966, now abandoned.

Description

The invention relates to perinone dyes of formula

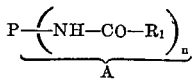

wherein P is a member selected from the group consisting of a mixture of monovalent radicals of formula

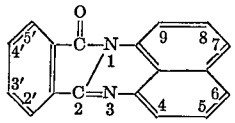

the free valency bond coming from carbon atoms 3' and 4', a mixture of monovalent radicals of formula

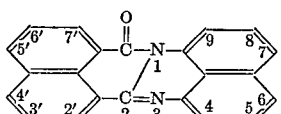

the free valency bond coming from carbon atoms 3' and 6', a monovalent radical of formula

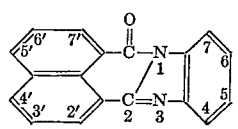

the free valency bond coming from carbon atom 6, and a mixture of bivalent radicals of formula

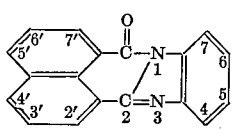

the free valency bonds coming from carbon atoms 6 and 3', and 6 and 6', $R_1$ is a member selected from the group consisting of cyclohexyl; naphthyl; unsubstituted phenyl; phenyl substituted by a member selected from the group consisting of fluorine, chlorine, alkyl having from 1 to 4 carbon atoms, trifluoromethyl and nitro; 4-(1,8-naphthalene-dicarboxylic acid imide)-phenyl; 4-(phenylcarbonylamino) - phenyl; 4-[4'-(phenylcarbonylamino)-phenylcarbonylamino]-phenyl; 4 - [4' - (phenyl-substituted by a member selected from the group consisting of fluorine, chlorine, alkyl having from 1 to 4 carbon atoms, trifluoromethyl and nitro-carbonylamino)-phenylcarbonylamino]-phenyl; 4-(4'-phthaloylimino-phenyl-carbonylamino)-phenyl and 4-[4'-(1,8-naphthalene-dicarboxylic acid imide)-phenyl-carbonylamino]-phenyl and $n$ is one of the numbers 1 or 2.

The process for the production of the dyes of Formula I consists of the condensation of $n$ mols of a compound of formula $$HOOC—R_1 \qquad (II)$$

or of one of its functional derivatives, with 1 mol of an aminoperinone of formula.

Functional derivatives of an acid of Formula II are for example the anhydrides, esters of low molecular alcohols (having 1 to 4 carbon atoms) or the acid halides, in particular the acid chlorides.

Perinone dyes containing two or more aryl radicals in their A radicals can be produced in stages as follows: 1 mol of an aminoperinone is condensed with $n$ mols of a carboxylic acid of formula $$HOOC—Aryl—Z \qquad (IV)$$

where Z represents the nitro group, an acylamino group, a sulphonylamino group or the radical —N=S=O, or with one of its functional derivatives as exemplified hereabove, the radical Z converted into the amino group, for example by reduction or saponification, the resulting compound again condensed with a carboxylic acid of Formula IV if desired, the substituent Z reduced or saponified to the amino group, and the compound finally condensed with $n$ mols of a carboxylic acid of one of the formulae

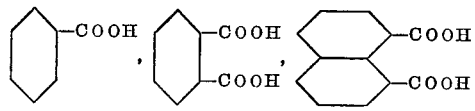

or

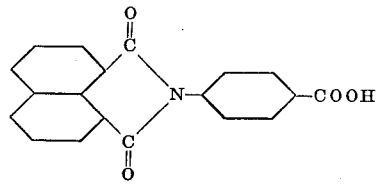

or with one of their functional derivatives (as above exemplified).

The condensation reaction is carried out in water-free, inert solvents, for example chlorobenzenes, nitrobenzene or xylenes, at temperatures of 60° to 200° C. or preferably 110° to 160° C. It is usually of advantage to work in the presence of acid-binding agents, such as alkali carbonates or bicarbonates, alkali acetates, pyridine, dimethyl formamide or dimethyl aniline. The water formed in the reaction can be distilled off or driven out by a jet of gas conducted over the surface of the reaction mixture.

EXAMPLE 1

A suspension of 28 parts of 6-amino-1, 2-naphthoylene-benzimidazole, 32 parts of 4-phthaloyliminobenzoyl chloride, 20 parts of anhydrous potassium carbonate and 1000 parts of chlorobenzene is heated for 16 hours at 120°. The water thus formed is distilled off. 45 Parts of 6-(4″-phthaloylimino-benzoylamino)-1, 2-naphthoylene-benzimidazole are obtained. This is suspended in 1000 parts of pyridine and 20 parts of hydrazine hydrate and the solution boiled for 2 hours. After dilution with water 20 parts of 6-(4″-aminobenzoylamino)-1, 2-naphthoylene-benzimidazole are obtained. This product can also be obtained by reacting 6-amino-1, 2-naphthoylene-benzimidazole with 4-nitrobenzoyl chloride with subsequent reduction of the nitro group.

A suspension of 20 parts of 6-(4″-aminobenzoylamino)-1, 2-naphthoylene-benzimidazole, 30 parts of 4-benzoylaminobenzoyl chloride, 10 parts of anhydrous potassium carbonate and 500 parts of chlorobenzene is heated at 120° for 16 hours, the water formed being distilled off. 37 Parts of the yellow compound 6-(4‴-benzoylamino - 4″-benzoylamino-benzoylamino) - 1, 2-naphthoylene-benzimidazole of the formula

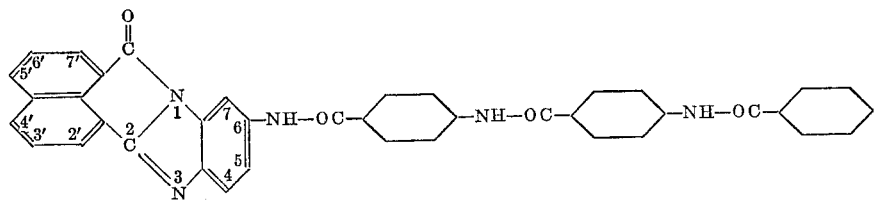

are obtained.

Similar pigment dyes are obtained when the suspension of 20 parts of 6-(4″-aminobenzoylamino)1, 2-naphthoylene-benzimidazole are reacted with equimolar amounts of 4-(4′-methyl-benzoylamino)-benzoyl chloride, 4-(4′-nitro-benzoylamino)-benzoylchloride, 4-(4′-chlorobenzoylamino)-benzoyl chloride, 4-(4′-fluoro-benzoylamino)-benzoyl chloride, 4-(2′, 4′-dichloro-benzoylamino)-benzoyl chloride, 4-(4′-tertiary-butyl-benzoylamino)-benzoyl chloride or 4-(4′-trifluoromethyl-benzoylamino)-benzoyl chloride, in place of 30 parts of 4-benzoylaminobenzoyl chloride.

Dyeing Example 5 parts of a dye obtained according to Example 1 are mixed with 1000 parts of poly-ε-caprolactam, which is then melted at 285° under nitrogen and spun. A dyed filament is obtained which is very fast to light, rubbing, sublimation and wet treatments and is suitable for the normal textile manufacturing processes.

EXAMPLE 2

A suspension of 10.8 parts of 6-amino-1, 2-naphthoylene-benzimidazole, 150 parts of chlorobenzene and 5 parts of dimethylaniline is heated at 120°. 8.8 parts of benzoyl chloride are dropped in and the stated temperature maintained for a further 2 hours or so until the starting product is no longer indicated. After isolation and purification 16 parts of a dye of formula

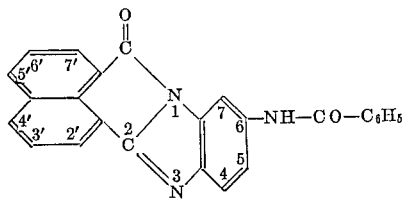

are obtained.

EXAMPLE 3

50 parts of a mixture of 6,3′- and 6,6′-dinitro-1,2-naphthoylene-benzimimidazole, as obtained by nitration in accordance with Coll. Czech. Chem. Commun., 28, 3352 (1963), are reduced with hydrogen in 1000 parts of dimethyl formamide in the presence of 5 parts of Raney nickel. 40 parts of a mixture of the corresponding diamino compounds are obtained. 6 parts of this mixture are suspended in 100 parts of chlorobenzene and brought to the boil, on which 10 parts of benzoyl chloride are added and boiling continued until no further starting product is indicated. After isolation and purification approximately 8 parts of the corresponding dibenzoylaminoperinones are obtained.

Dyes similar to those of Examples 2 and 3 are obtained when 6-amino-1,2-naphthoylene-benzimidazole or a mixture of 6,3′- and 6,6′-diamino-1,2-naphthoylene-benzimidazole is reacted in an analogous manner with other cyclic carboxylic acid chlorides in equimolar ratio. Examples of such carboxylic acid chlorides are 4-methyl-benzoic acid chloride, 4-trifluormethyl-benzoic acid chloride, 4-tertitary-butyl-benzoic acid chloride, 4-nitrobenzoic acid chloride, 4-chlorobenzoic acid chloride, 4-fluorobenzoic acid chloride, 2,4- and 3,4-dichlorobenzoic acid chloride, α- and β-naphthalenecarboxylic acid chloride and cyclohexane-carboxylic acid chloride.

EXAMPLE 4

A suspension of 5.7 parts of 6-amino-1,2-naphthoylene-benzimidazole and 7.3 parts of peri-naphthoyleneiminobenzoic acid chloride in 130 parts of anhydrous water-free dichlorobenzene is stirred at 150° until no further starting material is indicated. On isolation and purification about 10 parts of a yellow dye are obtained which has the formula

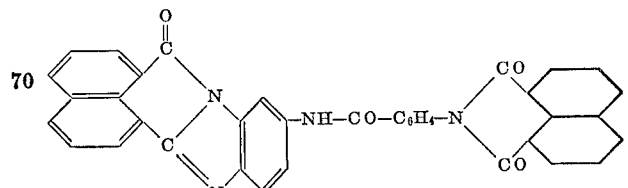

EXAMPLE 5

A suspension of 10.8 parts of 6-amino-1,2-naphthoylene-benzimidazole, 150 parts of chlorobenzene and 5 parts of dimethylaniline is heated at 120°. 10 parts of 4-nitrobenzoyl chloride are added dropwise and stirring continued at 120° until no further starting product is indicated. The nitro compound is isolated and reduced in the known way, e.g. by catalytic action with Raney nickel or NaHS, to the amino compound.

Condensation of 6-amino-1,2-naphthoylene-benzimidazole and 4-nitrobenzoyl chloride can also be carried out in aqueous medium. 71.5 parts of 6-amino-1,2-naphthoylene-benzimidazole in finely divided form are suspended in 2 litres of water, an excess of 4-nitrobenzoyl chloride is added, followed by sodium carbonate and, if necessary, pyridine or dimethyl formamide, on which the suspension is vigorously stirred at room temperature until the starting product is no longer indivated. After working up, 95–100 parts of 6-(4"-nitrobenzoylamino)-1,2-naphthoylene-benzimidazole are obtained; this can be reduced to 6-(4"-aminobenzoylamino)-1,2-naphthoylene as described in the foregoing.

8 parts of the resulting 6-(4"-aminobenzoylamino)-1,2-naphthoylenebenzimidazole and 6.3 parts of 4-phthaloyliminobenzoic acid chloride are dissolved in 130 parts of water-free dichlorobenzene and stirred at 150° until no further starting product is indicated. After isolation and purification about 12 parts of a yellow dye is obtained which has the formula

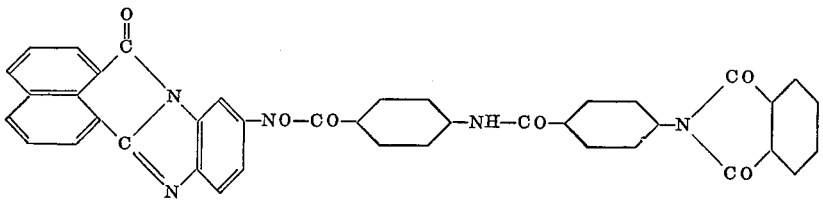

EXAMPLE 6

8 parts of 6-(4"-aminobenzoylamino)-1,2-naphthoylene-benzimidazole (as obtained in Example 5) and 7 parts of peri-naphthoyleneiminobenzoic acid chloride are dissolved in 200 parts of water-free chlorobenzene and 5 parts of pyridine and the solution is boiled with reflux until no further amine is indicated. The product is 13 parts of a yellow dye of formula

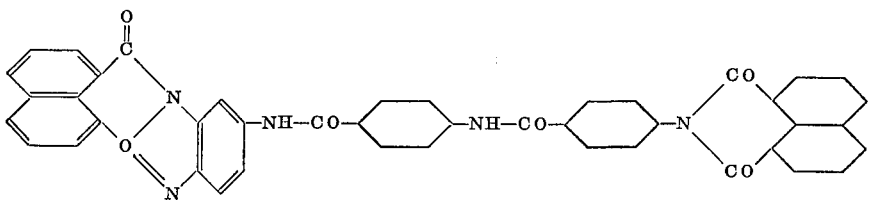

EXAMPLE 7

57 parts of a mixture of the perinone of formula

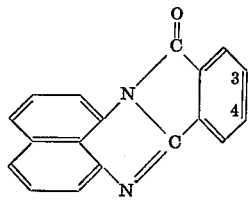

substituted by an amino group in the 3'- or 4'-position are dissolved in 1000 parts of water-free dichlorobenzene and heated at 150–160° with stirring, upon which 32 parts of benzoyl chloride are added and stirring continued at the same temperature until no further starting product is indicated. After isolation and purification 60–65 parts of a heterogeneous dye are obtained having the formula

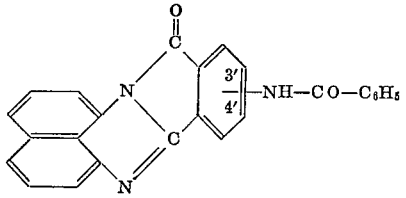

EXAMPLE 8

On analogous lines to Example 7, 40 parts of 4-nitrobenzoyl chloride, in place of 32 parts of benzoyl chloride, are reacted with the mixture of aminoperinones, after which the nitro group is reduced to the amino group in the known way, e.g. with Raney nickel. 80 parts of the resulting amine are suspended in 1000 parts of water-free dichlorobenzene with the addition of 63 parts of 4-benzoylaminobenzoyl chloride and stirred at 150–160° until the starting product is no longer indicated. On working up approximately 110 parts of a heterogeneous dye are obtained which has the formula

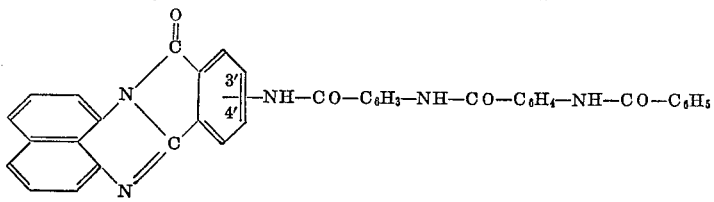

In place of the benzoyl chloride used in Example 7 or of the 4-benzoylaminobenzoyl chloride used in Example 8, equimolar amounts of the cyclic carboxylic acid chlorides enumerated in the final paragraph of Example 3 can be used.

EXAMPLE 9

62 parts of a mixture of perinones of formula

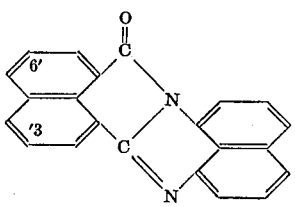

amino-substituted in 3'- or 6'-position, are suspended in 1000 parts of water-free dichlorobenzene and heated at 150–160° with stirring. After the addition of 40 parts of 4-nitrobenzoyl chloride stirring is continued at the same temperature until the starting product is no longer indicated, on which the final product, (4-nitrobenzoyl)-aminoperinone, is isolated and purified. After reduction of the nitro group 45 parts of the resulting amine are heated in 1000 parts of water-free dichlorobenzene at 150–160°, then 30 parts of 4-benzoylaminobenzoyl chloride are added and stirring continued until no starting product is indicated. On working up about 50 parts of a dark red dye are obtained.

Examples of representative dyes of the foregoing examples are as follows:

the free valency bond coming from carbon atoms 3' and 6', a monovalent radical of formula

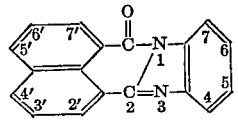

the free valency bond coming from carbon atom 6, and a mixture of bivalent radicals of formula

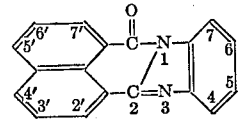

the free valency bonds coming from carbon atoms 6 and 3', and 6 and 6',

EXAMPLE 1

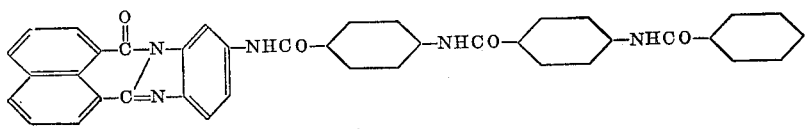

EXAMPLE 2

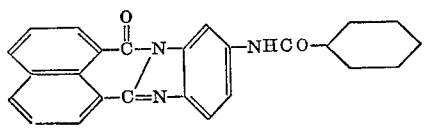

EXAMPLE 4

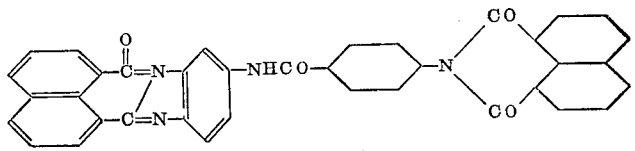

EXAMPLE 5

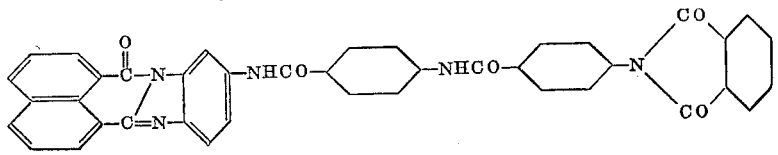

Having thus disclosed the invention, what we claim is:
1. Perinone pigmented dyes of formula $$P(-NH-CO-R_1)_n \quad (I)$$

wherein P is a member selected from the group consisting of a mixture of monovalent radicals of formula

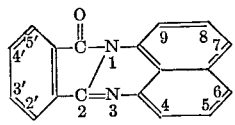

the free valency bond coming from carbon atoms 3' and 4', a mixture of monovalent radicals of formula

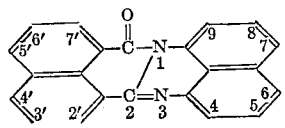

$R_1$ is a member selected from the group consisting of cyclohexyl; naphthyl; unsubstituted phenyl; phenyl substituted by a member selected from the group consisting of fluorine, chlorine, alkyl having from 1 to 4 carbon atoms, trifluoromethyl and nitro; 4-(1,8-naphthalene-dicarboxylic acid imide)-phenyl; 4-(phenyl-carbonylamino)-phenyl; 4-[4'-(phenylcarbonylamino)-phenylcarbonylamino]-phenyl; 4-[4'-phenyl-substituted by a member selected from the group consisting of fluorine, chlorine, alkyl having from 1 to 4 carbon atoms, trifluoromethyl and nitrocarbonylamino)-phenyl-carbonylamino]-phenyl; 4-(4'-phthaloylimino-phenyl-carbonylamino)-phenyl and 4-[4'-(1,8-naphthalene-dicarboxylic acid imide)-phenyl-carbonylamino]-phenyl and $n$ is one of the numbers 1 or 2.

2. The dye according to claim 1 of formula

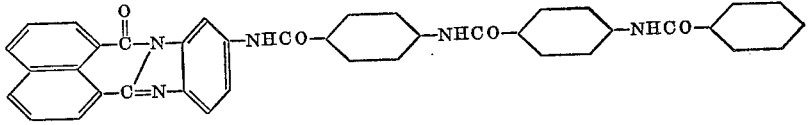

3. The dye according to claim 1 of formula
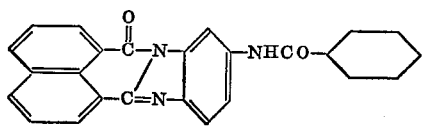
4. The dye according to claim 1 of formula
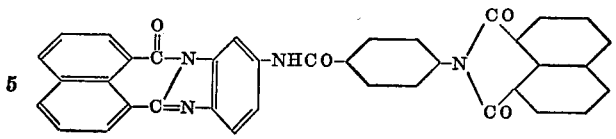
5. The dye according to claim 1 of formula
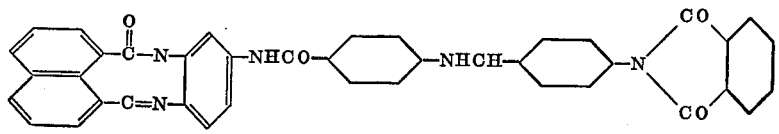
References Cited
FOREIGN PATENTS
1,489,369   7/1967   France.
ALEX MAZEL, *Primary Examiner.*
D. G. DAVIS, *Assistant Examiner.*
U.S. Cl. X.R.
260—282, 326, 515, 281; 8—55

PO-1050
(5/69)

UNITED STATES PATENT OFFICE
CERTIFICATE OF CORRECTION

Patent No. 3,428,637                     Dated February 18, 1969

Inventor(s) Xaver Pfister and Karl Ulrich Steiner

It is certified that error appears in the above-identified patent and that said Letters Patent are hereby corrected as shown below:

Column 3, line 14, correct "processed"; line 60, "1," should read -- -1,--. Column 4, line 25, "28, 3352" should read --28, 3352,--; line 43, correct "tertiary". Column 5, line 45, in the formula, "-NO-" should read -- -NH- --; line 60, in the formula, "O" should read --C-- in the structure

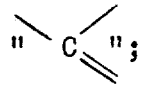

line 70, in the formula, "3" should read --3'-- and "4" should read --4'--. Column 6, line 32, in the formula, "$C_6H_3$" should read --$C_6H_4$--. Column 7, line 54, "pigmented" should read --pigment--; line 70, in the formula, the missing bond should be inserted between positions 3' and 2' as

Column 10, line 10, in the formula of claim 5, "NHCH" should read --NHCO--.

SIGNED AND
SEALED
MAR 3 - 1970

(SEAL)
Attest:

Edward M. Fletcher, Jr.
Attesting Officer

WILLIAM E. SCHUYLER, J
Commissioner of Patent